United States Patent [19]

Kobayashi

[11] Patent Number: 5,293,178
[45] Date of Patent: Mar. 8, 1994

[54] DISPLAY SCREEN INSPECTING APPARATUS

[75] Inventor: Akira Kobayashi, Osaka, Japan

[73] Assignee: Matsushita Electric Industrial Co., Ltd., Osaka, Japan

[21] Appl. No.: 902,895

[22] Filed: Jun. 23, 1992

[30] Foreign Application Priority Data

Jun. 27, 1991 [JP] Japan .................. 3-156932

[51] Int. Cl.⁵ .............................. G09G 3/36
[52] U.S. Cl. ................. 345/87; 345/DIG. 4; 348/92
[58] Field of Search ............. 340/784; 358/101, 106; 382/8, 57

[56] References Cited

U.S. PATENT DOCUMENTS

| | | | |
|---|---|---|---|
| 4,734,688 | 3/1988 | Adams | 340/765 |
| 4,870,357 | 9/1989 | Young et al. | 358/106 |
| 5,081,687 | 1/1992 | Henley et al. | 358/106 |
| 5,136,373 | 8/1992 | Kamiya et al. | 358/101 |

Primary Examiner—Ulysses Weldon
Assistant Examiner—Matthew Luu
Attorney, Agent, or Firm—Wenderoth, Lind & Ponack

[57] ABSTRACT

A display screen inspecting apparatus is for inspecting a display screen of a liquid crystal display having image density which changes in proportion to change of a driving voltage applied to the display screen. A driving voltage changing device changes the driving voltage to actuate the display screen, an image pick-up device picks up an image of a displaying state of the display screen driven with different driving voltages, a storage device stores image data related to the image density of images picked up by the image pick-up device when different driving voltages are applied to the display screen, an image density ratio operating/storing device determines and stores a ratio of the image density of the images stored by the storage device, and a deciding device decides whether the display screen is acceptable or unacceptable on the basis of change of the image density ratio.

5 Claims, 5 Drawing Sheets

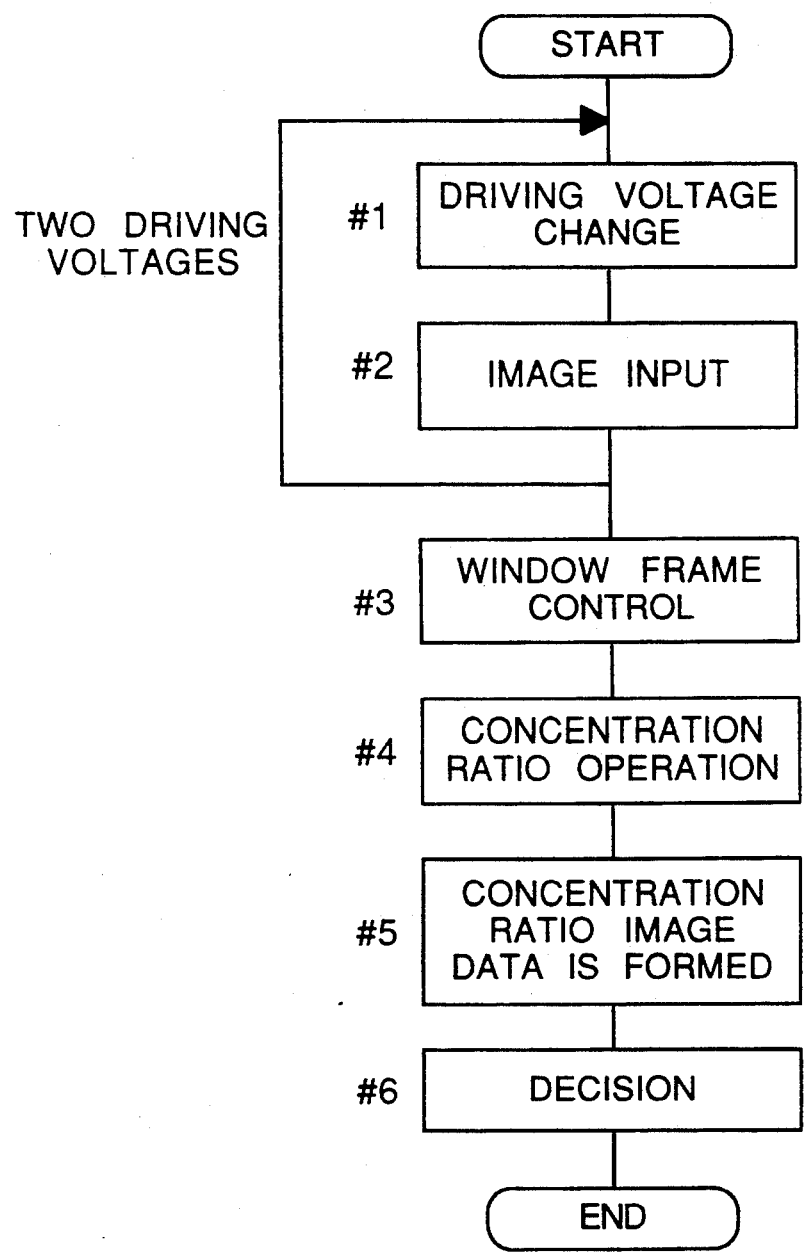

DISPLAY SCREEN INSPECTING APPARATUS

BACKGROUND OF THE INVENTION

The present invention relates to an inspecting apparatus designed for automatic sensor evaluation of a display screen such as a liquid crystal panel or the like.

While important researches and development have been made for liquid crystal panels in the past years, there is an inspection step in the manufacturing process of the liquid crystal panel to inspect the presence/absence of dust, foreign substance, irregularity or the like in the uniform background within the liquid crystal panel where the image density is changed. Although the inspection has been carried out through visual judgement with human eyes at present, its automatization is strongly required and therefore, enthusiastic attempts have been made to provide an automatic inspecting-/evaluating apparatus for automatic evaluation of the display quality of the produced liquid crystal panel.

Particularly, when the sensor evaluation of the liquid crystal panel is to be automated, it has been performed by processing picture images through a TV camera or the like.

An example of a conventional display screen inspecting apparatus of the type referred to above will be described below with reference to FIGS. 4 and 5.

FIG. 4 is a structural diagram of the display screen inspecting apparatus. A liquid crystal panel 22 to be inspected is put on a positioning table 21 and illuminated by an illuminating device 23. A TV camera 24 for picking up an image of a display screen of the liquid crystal panel 22 is supported by a movable TV camera supporting body 25. The TV camera 24 is controlled by a TV camera control circuit 26.

An image signal input through the TV camera 24 is sent to an analog/digital conversion circuit (referred to as an A/D conversion circuit) 27, where the signal is digitized into image data of 0–255 gradations (256 gradations) in accordance with the density of the image. The digitized image data is input to a microcomputer including a CPU, a ROM, a RAM, an input/output port, and the like which constitute a fundamental part of the display screen inspecting apparatus.

The display screen inspecting apparatus includes a decision control circuit (CPU) 28 to which instructions are supplied from a main controller or an operating panel, an unacceptable portion enhancing circuit 29 which enhances an unacceptable portion to the background through the LUT (Lookup Table) conversion or the like of the input image, a binarization circuit 30 which converts the enhanced image into two digits, and a decision circuit 31 which makes a decision of the display screen on the basis of the size, etc. of the unacceptable portion separated from the background by the binarization circuit 30.

The inspecting apparatus of the above-described structure operates in a manner as follows.

As shown in a flow chart of FIG. 5, when the liquid crystal panel 22 is activated to inspect an unacceptable portion therein, the, display screen of the liquid crystal panel 22 is viewed by the TV camera 24 and the image of the display screen is input to the inspecting apparatus (step #11). The unacceptable portion enhancing circuit 29 processes the input image by Lookup Table conversion or image integration or the like, to thereby enhance the unacceptable portion (step #12). The binarization circuit 30 changes the enhanced image into two digits in order to separate the unacceptable portion from the background (step #13), and then the decision circuit 31 decides whether or not the display screen is acceptable based on the size or the like of the unacceptable portion (step #14).

In the arrangement as described hereinabove, however, it is difficult to enhance the unacceptable portion if it is low in contrast, for example, because of the irregular orientation or if it has modest change in the image density, since the decision is based only on the information from the state of the display screen driven by one driving voltage. Therefore, stable detection cannot be expected in the prior art.

SUMMARY OF THE INVENTION

The object of the present invention is therefore to provide an improved display screen inspecting apparatus, for eliminating the aforementioned drawbacks in the prior art, which is adapted to detect an unacceptable portion of a display screen while enhancing the unacceptable portion and diminishing influences of the natural shading of the display screen.

In accomplishing these and other objects, according to one aspect of the present invention, there is provided a display screen inspecting apparatus for inspecting a display screen of a liquid crystal display of which image density is changed in proportion to a change of a driving voltage applied to the display screen, comprising:

a driving voltage changing means for changing the driving voltage to actuate the display screen;

an image pick-up means for picking up an image of a displaying state of the display screen driven with different driving voltages;

a storage means for storing image data related to a density of images picked up by the image pick-up means when different driving voltages are applied to the display screen;

a an image density ratio operating/storing means for operating and storing an image density ratio of the density of the images stored by the storage means; and a deciding means for deciding whether the display screen is acceptable or unacceptable on the basis of change of the image density ratio.

According to the present invention, even if an unacceptable portion of the display screen has poor contrast due to the orientation irregularity or the like or shows a modest change in the image density, since the display screen is activated with different driving voltages, the image density ratio of the images when the display screen is driven by the different driving voltages is operated, so that the image data is formed. Accordingly, the unacceptable portion can be enhanced without being influenced by the shading of the display screen, and the unacceptable efficiency is improved.

When the driving voltage is changed, the image density is proportionally changed at a normal portion of the display screen. Therefore, the normal portion assumes a constant image density ratio, showing a different change of the image density from the unacceptable portion, whereby the unacceptable portion is detected with ease.

BRIEF DESCRIPTION OF THE DRAWINGS

This and other objects and features of the present invention will become clear from the following description taken in conjunction with the preferred embodiment thereof with reference to the accompanying drawings, in which:

FIG. 2 is a flow chart of the operation of the apparatus of FIG. 1;

DETAILED DESCRIPTION OF THE PREFERRED EMBODIMENT

Figure 1:
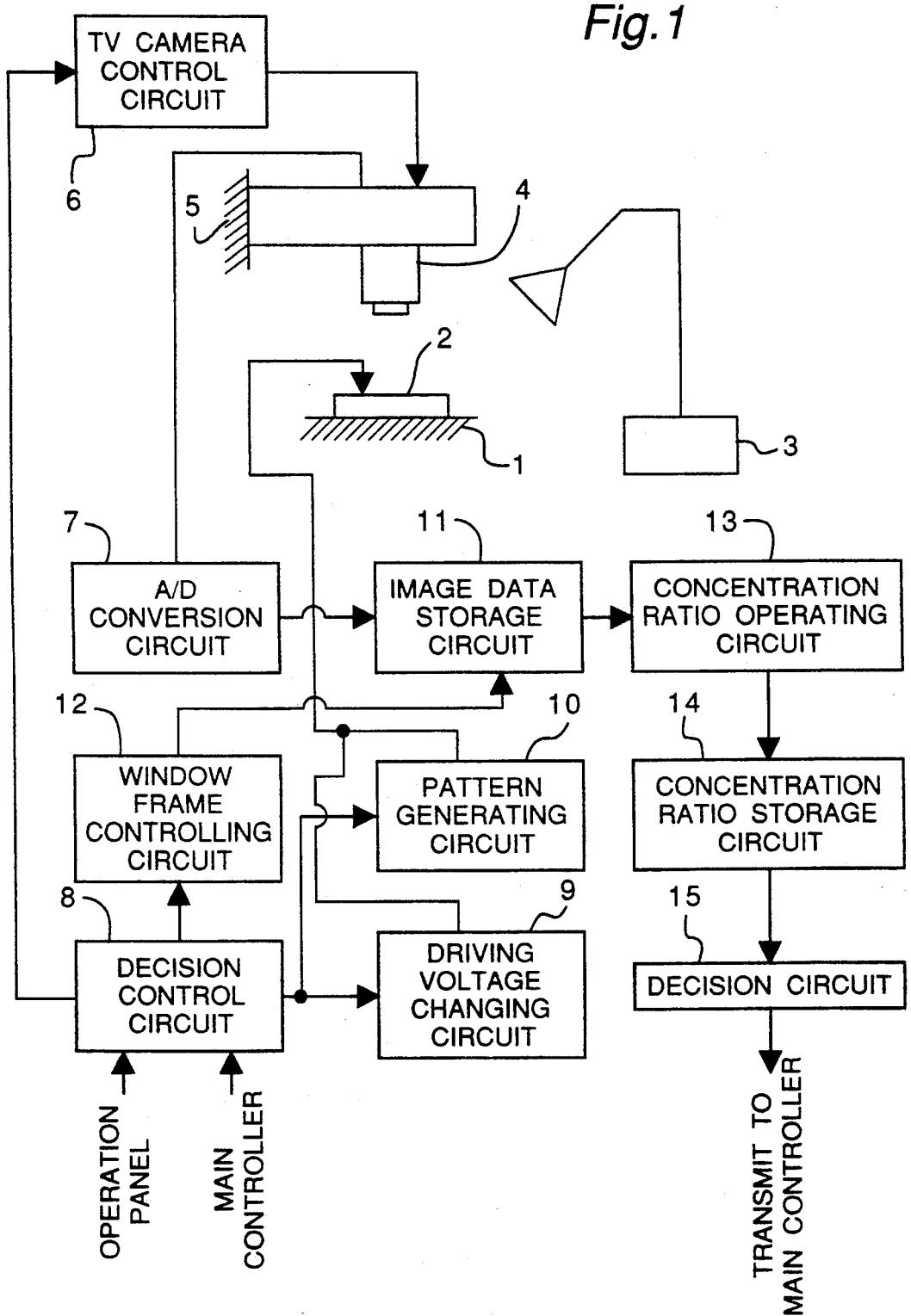
FIG. 1 is a structural diagram of a display screen inspecting apparatus according to a preferred embodiment of the present invention.

Before the description of the present invention proceeds, it is to be noted that like parts are designated by like reference numerals throughout the accompanying drawings.

The structure of a display screen inspecting apparatus of the embodiment of the present invention is shown in FIG. 1. An object to be inspected such as liquid crystal panel 2 is placed on a positioning table 1, which is illuminated by an illuminating device 3 as necessary. The display screen of the liquid crystal panel 2 is recognized through a TV camera 4 supported by a movable TV camera supporting unit 5. A TV camera control circuit 6 controls the TV camera 4.

An image signal input through the TV camera 4 is sent to an A/D conversion circuit 7 and converted into image data of, e.g., 0-255 gradations (256 gradations) in accordance with the density of the image, then input to a microcomputer comprised of a CPU, a ROM, a RAM, and an input/output port, etc. constituting a main part of the display screen inspecting apparatus.

The display screen inspecting apparatus of the embodiment includes the following eight circuits 8-15. More specifically, a decision controlling circuit (CPU) 8 receives instructions from a main controller or an operating panel. A driving voltage changing circuit 9 changes a driving voltage to be fed to the liquid crystal panel 2, so that the liquid crystal panel 2 assumes different operating states with different driving voltages. A pattern generating circuit 10 uniformly displays a pattern on the liquid crystal panel 2 to make the whole area thereof turn dark or light. Image data picked up by the TV camera 4 when the liquid crystal panel 2 is driven with different driving voltages is stored in an image data storage circuit 11. A window frame controlling circuit 12 specifies an area to be processed. An image density ratio operating circuit 13, upon receipt of the image data from the storage circuit 11, determines the image density ratio and the like of the image data, and the result is stored in a image density ratio storage circuit 14. A decision circuit 15 makes a decision that there is an unacceptable portion in the display panel when the variance to evaluate the irregularity of the image density ratio is not smaller than a predetermined value.

The operation of the display screen inspecting apparatus in the above-described structure will be discussed hereinbelow with reference to FIGS. 2 and 3.

Figure 3A:
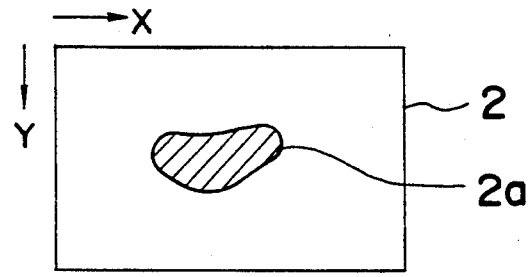
FIGS. 3(a)-(e) is a diagram explanatory of images and image data in the apparatus of FIG. 1.
Figure 3B:
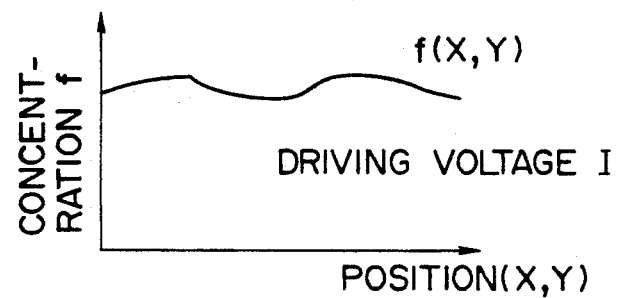
Figure 3C:
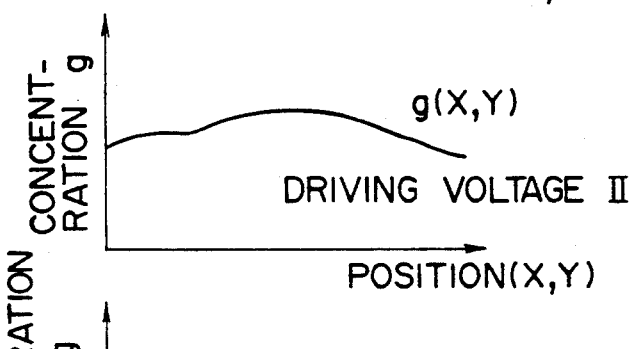
Figure 3D:
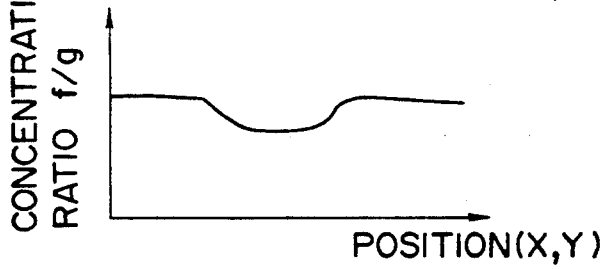
Figure 3E:
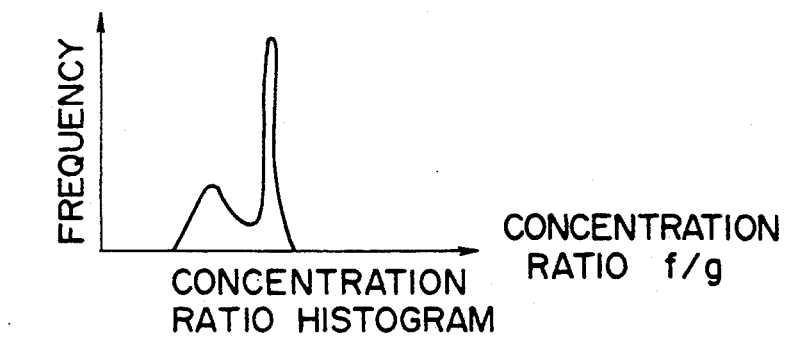
Figure 4:
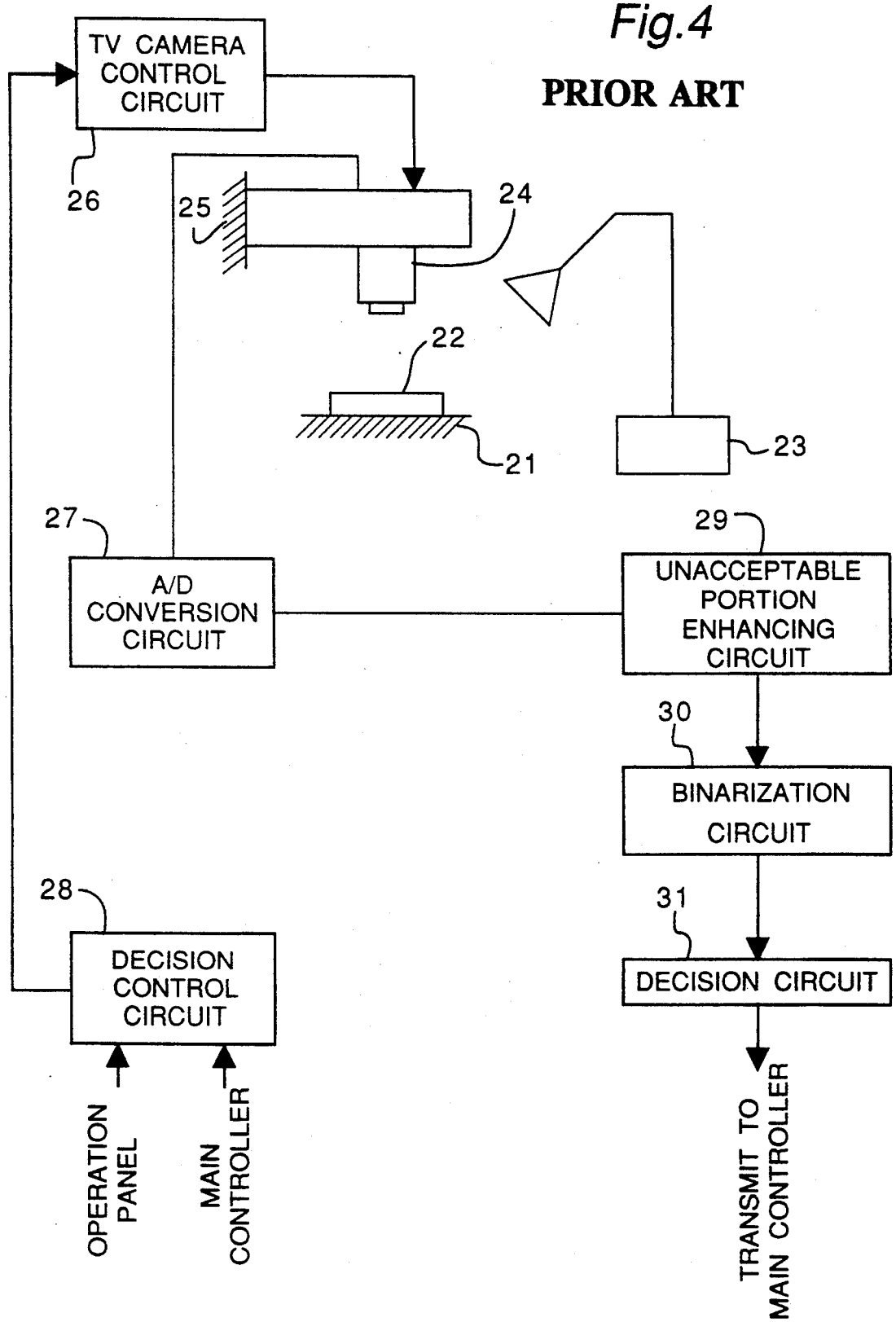
FIG. 4 is a structural diagram of a conventional display screen inspecting apparatus.
Figure 5:
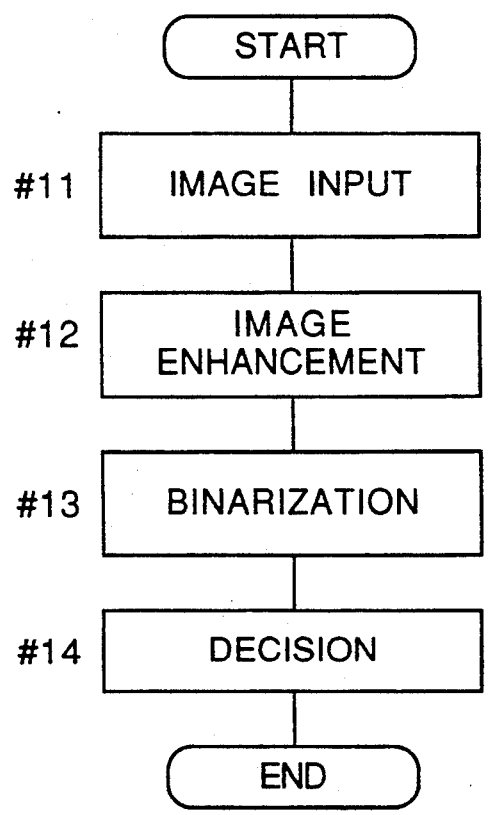
FIG. 5 is a flow chart of the operation of the apparatus of FIG. 4.

In order to detect an unacceptable portion 2a of the liquid crystal panel 2 (referring to FIG. 3(a)), in the first place, dot patterns or nothing is displayed by the pattern generating circuit 10 on the whole area of the liquid crystal panel 2 to make it turn dark or light by applying the different driving voltages to the liquid crystal panel 2 by the driving voltage changing circuit 9 (step #1), as shown in a flow chart of FIG. 2. The display screen of the liquid crystal panel 2 driven with different driving voltages is picked up through the TV camera 4 and stored in the image data storage circuit 11, so that the image data f, g (referring to FIGS. 3(b), 3(c)) related to the image density of the images are obtained (step #2). An area to be processed is specified by the window frame controlling circuit 12 (step #3). Then, the concentration ratio f/g of each pixel corresponding to the obtained image data f, g is determined in the image density ratio operating circuit 13 (step #4), and an image data of the obtained image density ratio (referring to FIG. 3(d)) is formed and stored in the image density ratio storage circuit 14 (step #5). An unacceptable portion is detected based on this image data by the decision circuit 15. At this time, the position of the unacceptable portion in the liquid crystal panel 2 can easily be also detected based on FIG. 3(d). If the liquid crystal panel 2 is acceptable, when the driving voltage is changed, the image density of the liquid crystal panel is changed in proportion (direct proportion or indirect proportion) to the change of the driving voltage. If the liquid crystal panel 2 is unacceptable, when the driving voltage is changed, the concentration of the liquid crystal panel is not changed in proportion to the change of the driving voltage. Therefore, acceptable portions represent the image density ratio approximately equal to each other in the image data formed in accordance with the image density ratio of pixels, while an unacceptable portion shows a difference to the in the image density ratio of the acceptable portions (referring to a histogram of the image density ratio in FIG. 3(e)). Then, when the driving voltage is changed, the density is proportionally changed at a normal portion (acceptable portion) of the display screen. Therefore, the normal portion assumes a constant image density ratio, showing a different change of the image density from the unacceptable portion, whereby the unacceptable portion is detected with ease. Accordingly, the display screen is decided as acceptable or unacceptable from the variance of the image density ratio in the decision circuit 15 (step #6).

It is also possible to analyze the display screen in a manner such that the image data of the image density ratio is turned into two digits or processed by differentiation in the decision circuit 15, to thereby detect a portion where the image density ratio is changed, and the size or the like of the portion is used for decision.

Accordingly, the present embodiment makes it possible to stably detect an unacceptable portion even with low contrast or moderate concentration change from the liquid crystal panel 2 including a shaded area.

As is clear from the foregoing description of the present invention, a defect of the display screen with low contrast or modest change in the image density can be enhanced and detected by driving the display screen with different driving voltages, thus realizing highly efficient inspection of the display screen.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A display screen inspecting apparatus for inspecting a liquid crystal display having an image density which varies in proportion to a change in a drive voltage applied to the liquid crystal display, said apparatus comprising:

drive voltage varying means for applying plural different drive voltages to the liquid crystal display to obtain respective plural images on the liquid crystal display having different image densities;

image pick-up means for picking up an image of the respective plural images on the liquid crystal display having different image densities;

storage means for storing data indicative of the different image densities of the plural images picked up by said image pick-up means;

image density ratio means for determining a ratio of the different image densities stored in said storage means and for storing the thus determined image density ratio;

decision means for determining an acceptability of the liquid crystal display based on an extent of a variance in the image density ratio stored in said image density ratio means.

2. The display screen inspecting apparatus as claimed in claim 1, further comprising a pattern generating means for uniformly displaying a pattern on an entire area of the display screen.

3. The display screen inspecting apparatus as claimed in claim 1, wherein the decision means decides whether the liquid crystal is acceptable or unacceptable on the basis of whether the variance in the image density ratio is smaller than a predetermined value.

4. The display screen inspecting apparatus as claimed in claim 1, wherein the decision means converts data of the image density ratio into two digits, detects a portion where the image density ratio is changed, and then decides whether the liquid crystal display is acceptable or unacceptable on the basis of size of the portion.

5. The display screen inspecting apparatus as claimed in claim 1, wherein the decision means processes date of the image density ratio by differentiation, detects a portion where the image density ratio is changed, and then decides whether the display screen is acceptable or unacceptable on the basis of size of the portion.

* * * * *